G. L. STUEBNER.
SCOOP GAGING BUCKET.
APPLICATION FILED AUG. 16, 1907.
913,319.
Patented Feb. 23, 1909.
2 SHEETS—SHEET 2.
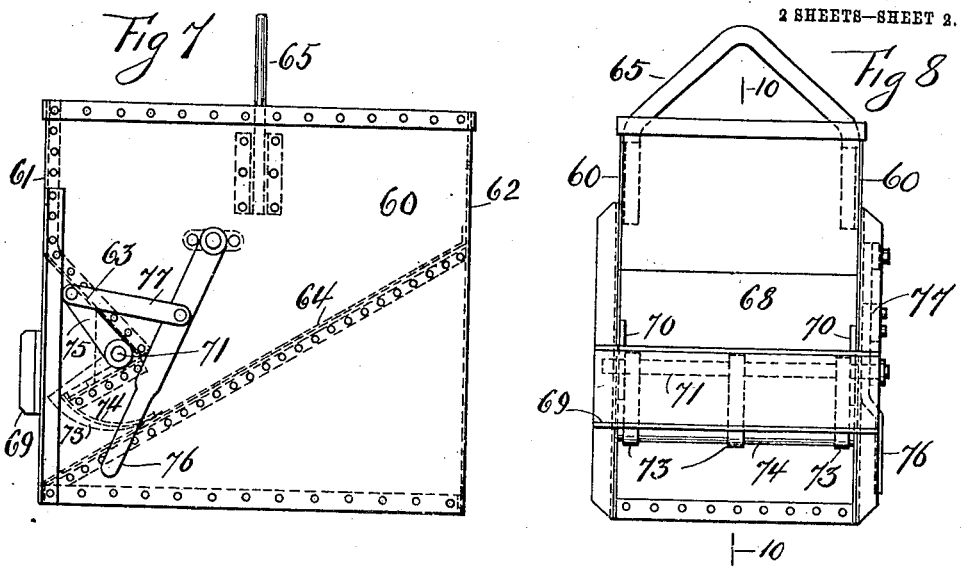
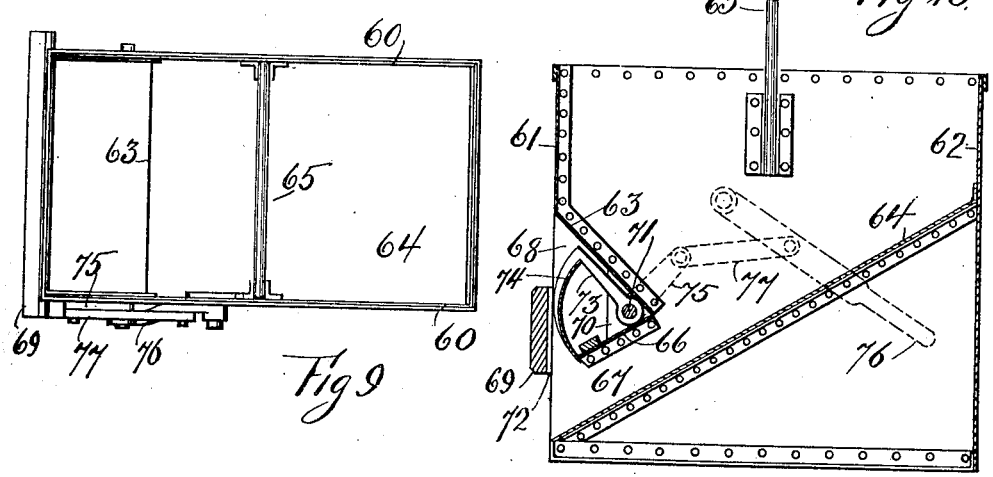
Witnesses
Martin Zimansky
John J. Millin
Inventor
Gustavus L. Stuebner
By his Attorney

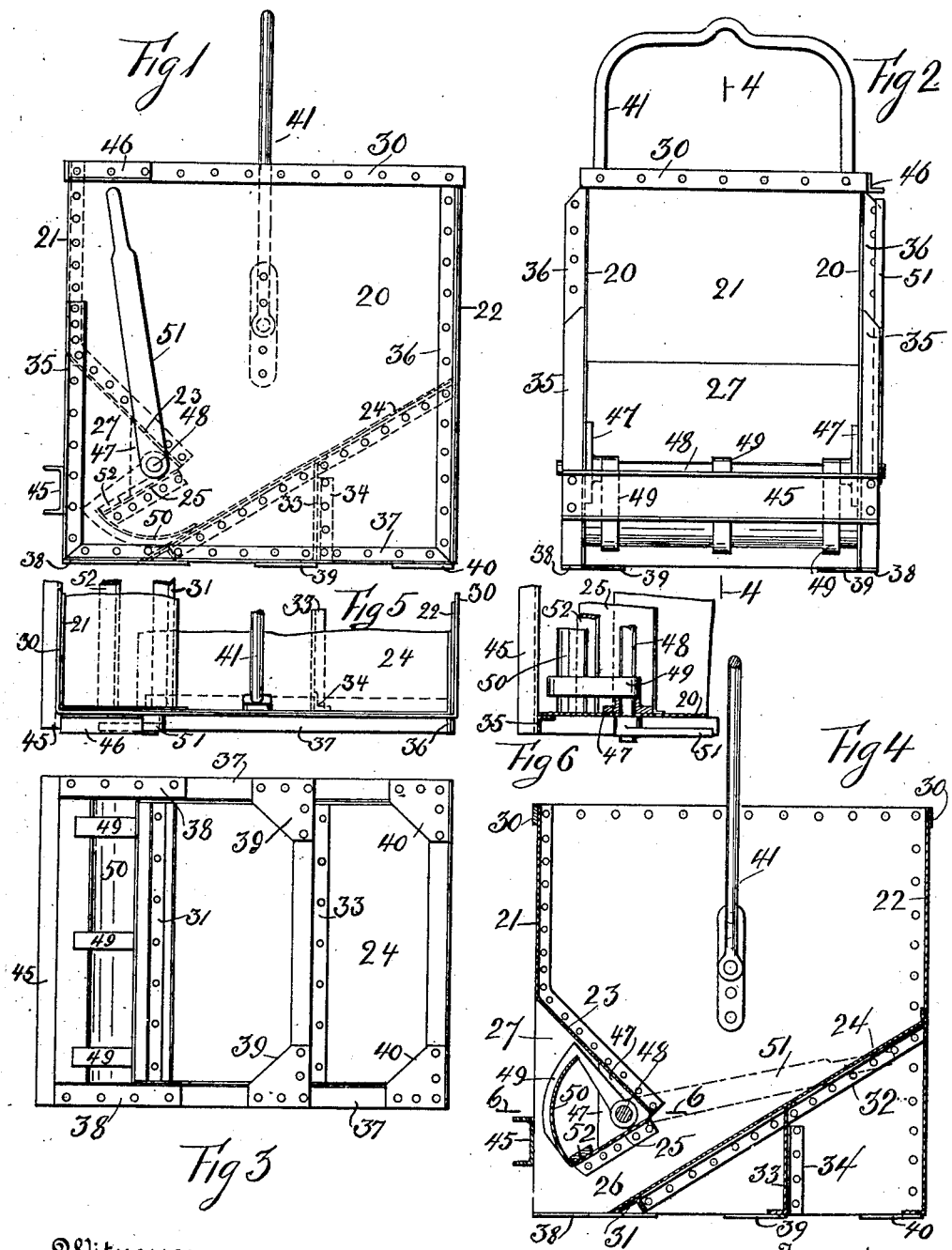

UNITED STATES PATENT OFFICE.

GUSTAVUS L. STUEBNER, OF NEW YORK, N. Y.

SCOOP-GAGING BUCKET.

No. 913,319.  Specification of Letters Patent.  Patented Feb. 23, 1909.

Application filed August 16, 1907. Serial No. 388,821.

*To all whom it may concern:*

Be it known that I, GUSTAVUS L. STUEBNER, a citizen of the United States, and a resident of the city of New York, borough of Queens, in the county of Queens and State of New York, have invented certain new and useful Improvements in Scoop-Gaging Buckets, of which the following is a specification.

This invention relates to scoop gaging buckets. Its object is the production of a bucket with means to control the discharge thereof.

The organization of the invention comprises a bucket with a scoop hinged to a spout or outlet in the lower portion thereof, and means to control the position of the scoop to vary the area of the outlet of the bucket, and to completely close the same. The scoop operates in a reëntering angle formed with the body of the bucket.

In the drawings Figure 1 shows a front view of a bucket exemplifying the invention and its gage scoop closed, Fig. 2 represents a left hand side view of Fig. 1, Fig. 3 is a bottom plan view of Fig. 1, Fig. 4 shows a section as on the line 4, 4, of Fig. 2 with its gage scoop open, Fig. 5 is a partial top plan view of Fig. 1, Fig. 6 represents a partial section of Fig. 4 on the line 6, 6, Fig. 7 represents a front view of a bucket with a modification of the invention, Fig. 8 is a left hand side view of Fig. 7, Fig. 9 shows a top plan view of Fig. 7 and Fig. 10 represents a section as on the line 10, 10 of Fig. 8 with the movable parts in a changed position.

Referring to Figs. 1 to 6 the bucket is shown with the sides 20, ends 21, 22, inclined bottoms 23, 24, the latter bottom extending below and beyond the lower edge of the former. A throat plate 25 joins with the bottom 23 forming the reëntering angle 27 and with the bottom 24 forms the spout 26. The sides and ends of the bucket are reinforced with the strengthening ring 30. Angles 31 and 32 support the inclined bottom 24, and the cross plate 33, which is fastened to angles 34, also supports the bottom 24 of the bucket. Reinforcing angles 35, 36 and 37 strengthen the sides 20, and stiffening plates 38, 39 and 40 protect the outside of the bottom of the bucket. A bail 41 extends from the sides 20 of the bucket. A guard rail 45 connects the angles 35 over the reëntering angle 27, and a guard rail 46 extends from the strengthening ring 30 at the upper portion of one of the sides 20. To the sides 20 are fastened journal bearings 47 for the scoop shaft 48 located in the reëntering angle 27. The said shaft has extending therefrom the handle 51 and the brackets 49, which latter carry the concaved scoop plate 50. The shaft 48 with its brackets and scoop plate forms a door, which I will herein term a gage scoop. A strengthening and separating bar 52 is located upon the throat plate 25 to prevent the gage scoop swinging too far in to the spout 26.

In Figs. 7 to 10 is represented a bucket with modified means to operate the gage scoop. The bucket has the sides 60, ends 61, 62 and inclined bottoms 63, 64, and throat plate 66. The plate 66 with the bottom 64 forms the spout 67, and with the bottom 63 forms the reëntering angle 68 in the body of the bucket. A guard plank 69 with the filling out pieces 72 extends over the reëntering angle 68. A bail 65 extends from the sides 60, and to the said sides are fastened the journal bearings 70 that support the scoop shaft 71 having extending therefrom the brackets 73 carrying the scoop plate 74. From the shaft 71 extends the arm 75, and to one of the sides 60 is fulcrumed the operating handle 76 which latter is connected to the arm 75 with the link 77.

The essential difference between the two forms of buckets represented consists in the locations of the operating handles 51 and 76. The former being controlled above the gage scoop and the latter below the same.

When using the bucket, the weights of the respective brackets 49 and 73 with their scoop plates automatically close the spouts with which they co-act. When empty, and after the buckets are charged with material, the handles are moved to give the requisite outlet openings, gaging the openings of the spouts so that material can be discharged or flow from the bucket as required.

Having described my invention, I claim:

1. In a bucket the combination of inclined bottoms, one of the bottoms extending below and beyond the lower edge of the other, a throat plate over the lower bottom forming a spout therewith and a gage scoop fulcrumed to the bucket to coact with said spout.

2. In a bucket the combination of inclined bottoms, one of the bottoms extending below and beyond the lower edge of the other, a throat plate over the lower bottom forming a spout therewith, a shaft journaled between the sides of the bucket, brackets extending from the shaft, a scoop plate secured to the brackets, and means to swing the shaft with its appurtenances.

3. In a bucket the combination of a body having a reëntering angle, bottoms on the bucket one of which extends below and beyond the lower edge of the other, a throat plate extending from the upper bottom of the bucket and forming a spout with the lower bottom, a door fulcrumed in the reëntering angle and coacting with the spout.

4. In a bucket the combination of a body having a reëntering angle therein, inclined bottoms for the bucket, one of said bottoms extending below and beyond the lower edge of the other, a throat plate over the lower bottom and forming a spout therewith, a shaft journaled to the body of the bucket in said reëntering angle, brackets extending from the shaft, a curved scoop plate secured to the brackets, a handle extending from the shaft to gage the opening through the spout with the curved scoop plate.

5. In a bucket the combination of a body, inclined bottoms for the bucket, one of said bottoms extending below and beyond the lower edge of the other, a throat plate over one of said bottoms and joining with the other bottom forming a reëntering angle and a spout for the said bucket, a shaft journaled to the body of the bucket in said reëntering angle, a guard rail over said angle, a curved scoop plate connected with the shaft to coact with the spout, and a handle on the shaft.

Signed at the borough of Queens in the county of Queens and State of New York this 14th day of August A. D. 1907.

GUSTAVUS L. STUEBNER.

Witnesses:
 GEO. A. STUEBNER,
 JOHN L. BRESLOFF.